(12) United States Patent
Thompson

(10) Patent No.: US 7,049,541 B1
(45) Date of Patent: May 23, 2006

(54) CUTTING GUIDE FOR PLASMA TORCH

(76) Inventor: Eric Q. Thompson, 6945 Amberwick Way, Citrus Heights, CA (US) 95621

( * ) Notice: Subject to any disclaimer, the term of this patent is extended or adjusted under 35 U.S.C. 154(b) by 70 days.

(21) Appl. No.: 10/905,626

(22) Filed: Jan. 13, 2005

(51) Int. Cl.
B23K 10/00 (2006.01)

(52) U.S. Cl. ............ 219/121.45; 219/121.48; 219/121.39; 266/70; 408/78; 408/115 R

(58) Field of Classification Search ........... 219/121.48, 219/121.56, 121.39, 121.44, 121.59, 125.11, 219/125.21, 121.36; 266/76, 46, 48, 70; 408/77, 78, 115 R, 115 B, 67, 209
See application file for complete search history.

(56) References Cited

U.S. PATENT DOCUMENTS

| | | | |
|---|---|---|---|
| 3,417,979 A * | 12/1968 | Harold et al. ............... 266/64 |
| 3,880,546 A | 4/1975 | Segal | |
| 3,886,242 A | 5/1975 | McGregor | |
| 3,941,358 A * | 3/1976 | Darling ......................... 266/68 |
| 4,959,520 A * | 9/1990 | Okada et al. ........... 219/121.48 |
| 5,651,646 A | 7/1997 | Banke et al. | |
| 5,989,485 A * | 11/1999 | Staacks et al. ................. 266/76 |
| 6,171,032 B1 | 1/2001 | Forche et al. | |

* cited by examiner

*Primary Examiner*—Mark Paschall
(74) *Attorney, Agent, or Firm*—Donald R. Schoonover

(57) ABSTRACT

A guide that is used in conjunction with a plasma cutting torch includes a main circular ring having a small circular ring mounted on the outer periphery thereof. The small ring includes a bearing assembly and accommodates the plasma cutting torch. A guide bolt is mounted on the main circular ring and is attached to the workpiece and forms the center of a circular hole that will be cut with the plasma torch. Once the main ring is attached to the workpiece, the plasma torch is attached to the small ring. The torch and rings are then rotated about the bolt with the plasma torch activated to cut a hole that has a radius equal to the radius of the main circular ring plus the radius of the small ring.

1 Claim, 1 Drawing Sheet

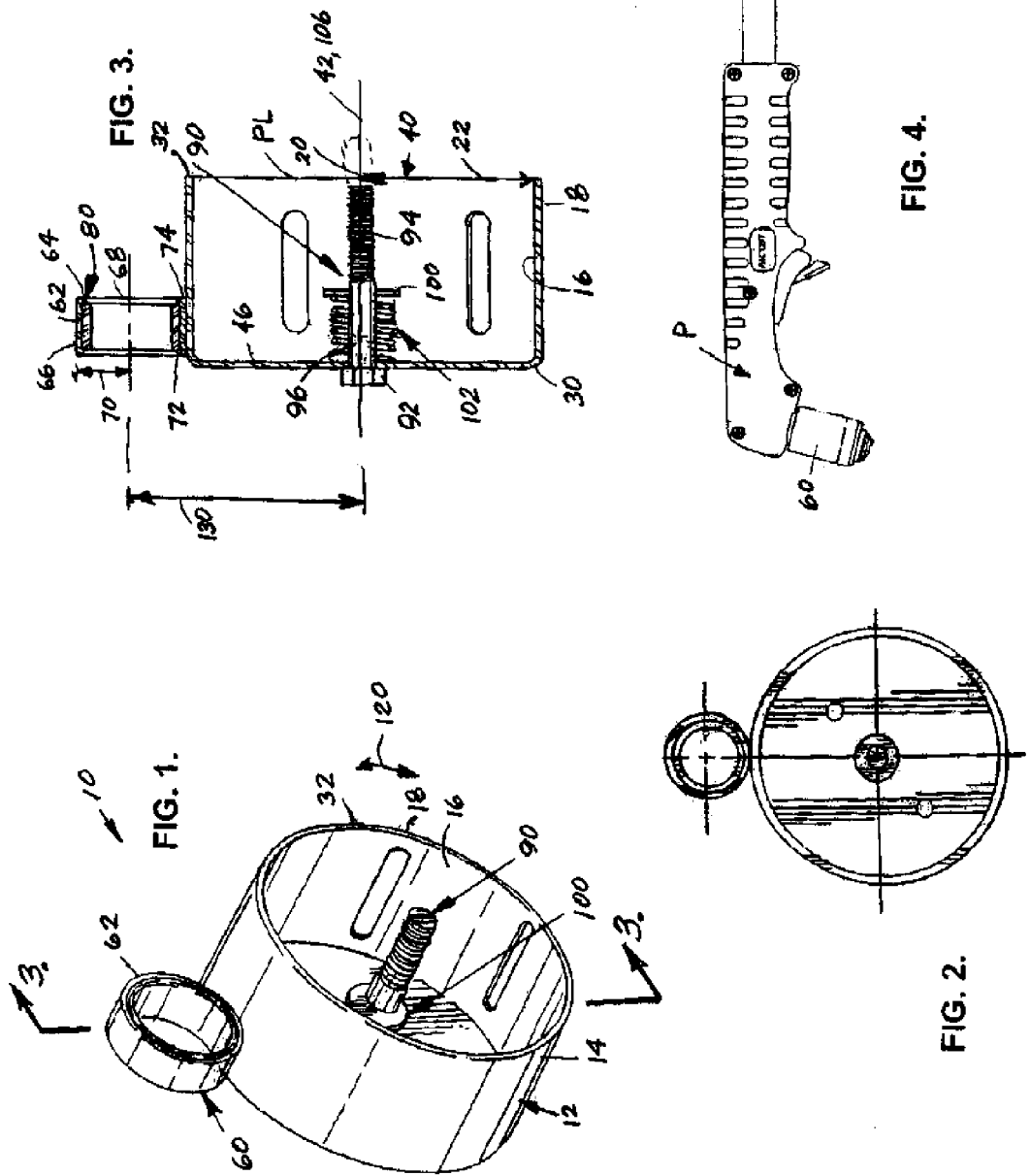

CUTTING GUIDE FOR PLASMA TORCH

BACKGROUND OF THE INVENTION

The present invention relates to the general art of cutting, and to the particular field of cutting with a guide.

Many workers are required to cut precise and accurate holes in a workpiece. The hole can be used to accommodate wiring, conduits or the like. Sometimes, the hole must be cut into steel or other such hard substance. In such cases, the cutting tool may be expensive and the workpiece may also be very expensive. Accordingly, any errors should then be, if not totally avoided, at least minimized.

Therefore, there is a need for a cutting tool that can define precise cuts in hard workpieces with a minimum of error or waste.

Still further, any hole that is cut with tools known to the inventor often leaves debris or jagged edges on the workpiece. Such debris or jagged edges must be cleaned up which may be a time-consuming task.

Therefore, there is a need for a cutting tool that can define precise and clean cuts in hard workpieces with a minimum of error or waste.

Any cutting device should be easy and convenient to use; otherwise, it may not be commercially viable.

Therefore, there is a need for a cutting tool that can easily define precise and clean cuts in hard workpieces with a minimum of error or waste.

PRINCIPAL OBJECTS OF THE INVENTION

It is a main object of the present invention to provide a cutting tool that can define precise cuts in hard workpieces with a minimum of error or waste.

It is another object of the present invention to provide a cutting tool that can define precise and clean cuts in hard workpieces with a minimum of error or waste.

It is another object of the present invention to provide a cutting tool that can easily define precise and clean cuts in hard workpieces with a minimum of error or waste.

SUMMARY OF THE INVENTION

These, and other, objects are achieved by a guide for use with a plasma torch which comprises a main circular ring having a small circular ring mounted on the outer periphery thereof. The small ring includes a bearing assembly and accommodates a plasma cutting torch. A guide bolt is mounted on the main circular ring and is attached to the workpiece and forms the center of a circular hole that will be cut with the plasma torch. Once the main ring is attached to the workpiece, a plasma torch is attached to the small ring. The torch and rings are then rotated about the bolt with the plasma torch activated to cut a hole that has a radius equal to the radius of the main circular ring plus the radius of the small ring.

Using the guide embodying the present invention will permit a worker to define an accurate and clean hole in a workpiece using a plasma torch. The hole will be accurate and will not have any jagged edges or debris associated therewith. The guide is easy and efficient to use and can be set up and removed easily and efficiently.

BRIEF DESCRIPTION OF THE DRAWING FIGURES

FIG. 1 is a perspective view of a plasma hole cutter guide embodying the present invention.

FIG. 2 is a front elevational view of the cutter guide shown in FIG. 1.

FIG. 3 is an elevational view taken along line 3—3 of FIG. 1.

FIG. 4 is a side elevational view of a plasma torch in combination with the cutter guide embodying the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a guide 10 for use with a plasma torch and which achieves the above-stated objectives.

Guide 10 can be formed of steel or other such material and comprises a main ring 12. Main ring 12 includes a circular wall 14 which has a first surface 16, which is an inner surface when main ring 12 is in use, and a second surface 18, which is an outer surface when main ring 12 is in use. A center 20 is defined by the circular wall 14 and a radius 22 extends from center 20 to second surface 18 of circular wall 14. Main ring 12 further includes a first end 30 which is a top end when main ring 12 is in use and a second end 32 which is a bottom end when main ring 12 is in use. Second end 32 encloses an area 40. A longitudinal axis 42 extends between first end 30 and second end 32 along the center of circular wall 14.

A planar wall 46 is a top wall when main ring 12 is in use and is one piece with first end 30 of circular wall 14. Wall 46 spans area 40 enclosed by the circular wall 14.

A torch-supporting ring 60 is fixedly mounted on second surface 18 of circular wall 14.

Ring 60 includes a circular wall 62 which has a first surface 64, which is an inner surface when torch-supporting ring 60 is in use, and a second surface 66, which is an outer surface when torch-supporting ring 60 is in use. A center 68 is defined by circular wall 62 and a radius 70 extends from center 68 to second surface 66. A first end 72 is a top end when torch-supporting ring 60 is in use and a second end 74 is a bottom end when torch-supporting ring 60 is in use.

A bearing assembly 80 is mounted on torch-supporting ring 60 adjacent to first surface 64. Bearing assembly 80 accommodates a plasma torch P when in use as shown in FIG. 4.

A set bolt 90 is mounted on planar wall 46 and extends along longitudinal axis 42 of main ring 12. Set bolt 90 includes a head 92 that is in abutting relationship with planar wall 46, a threaded portion 94 which extends beyond a plane PL which contains second end 32 of circular wall 14. Bolt 90 further includes a shank portion 96 that is located between head 92 and threaded portion 94 of set bolt 90.

A spring rest 100 is mounted on shank 96 and a spring 102 is located between planar wall 46 and spring rest 100. Spring 102 biases set bolt 90 away from planar wall 46 to maintain the bolt 90 securely in place on the wall 46.

Set bolt 90 has a longitudinal axis 106 which is congruent with longitudinal axis 42 of circular wall 14.

Planar wall 46 is rotatably connected to set bolt 90 to rotate about longitudinal axis 106 of the set bolt as indicated by arrow 120 in FIG. 1.

A cutting radius 130 is defined between center 20 of circular wall 14 of main ring 12 and center 68 of circular wall 62 of torch-supporting ring 60.

Use of guide 10 includes defining a small hole in the workpiece at the location whereat the center of a hole to be cut will be, securing bolt 90 to the hole thus defined in the workpiece, attaching plasma torch P to ring 60, activating the torch and rotating guide 10, with the plasma torch attached and operating, about bolt 90. A hole having a radius equal to radius 130 will be defined.

It is to be understood that while certain forms of the present invention have been illustrated and described herein, it is not to be limited to the specific forms or arrangements of parts described and shown.

What is claimed is:

1. A guide for use with a plasma torch comprising:
    (a) a main ring which includes
        (1) a circular wall having a first surface which is an inner surface when said main ring is in use, a second surface which is an outer surface when said main ring is in use, a center, a radius which extends from the center of the circular wall to the second surface of the circular wall, a first end which is a top end when said main ring is in use, a second end which is a bottom end when said main ring is in use, the second end enclosing an area, a longitudinal axis which extends between the first end and the second end along the center of the circular wall of said main ring, and
        (2) a planar wall which is a top wall when said main ring is in use, the wall being one piece with the first end of the circular wall and spanning the area enclosed by the circular wall;
    (b) a plasma torch-supporting ring which is fixedly mounted on the second surface of the circular wall of said main ring and which includes
        (1) a circular wall having a first surface which is an inner surface when said torch-supporting ring is in use, a second surface which is an outer surface when said plasma torch-supporting ring is in use, a center, a radius which extends from the center of the circular wall of said plasma torch-supporting ring to the second surface of said plasma torch-supporting ring, a first end which is a top end when said plasma torch-supporting ring is in use, a second end which is a bottom end when said plasma torch-supporting ring is in use, and
        (2) a bearing assembly mounted on said plasma torch-supporting ring adjacent to the first surface of the circular wall of said plasma torch-supporting ring, the bearing assembly accommodating a plasma torch when in use;
    (c) a set bolt mounted on the planar wall of said main ring and extending along the longitudinal axis of said main ring, said set bolt including
        (1) a head that is in abutting relationship with the planar wall of said main ring,
        (2) a threaded portion which extends beyond a plane containing the second end of the circular wall of said main ring,
        (3) a shank portion that is located between the head and the threaded portion of said set bolt,
        (4) a spring rest mounted on the shank of said set bolt,
        (5) a spring located between the planar wall of said main ring and the spring rest of said set bolt, the spring biasing said set bolt away from the planar wall of said main ring, and
        (6) said set bolt having a longitudinal axis which is congruent with the longitudinal axis of the circular wall of said main ring;
    (d) the planar wall of said main ring being rotatably connected to said set bolt to rotate about the longitudinal axis of said set bolt; and
    (e) a cutting radius defined between the center of the circular wall of said main ring and the center of the circular wall of said plasma torch-supporting ring.

* * * * *